No. 854,517. PATENTED MAY 21, 1907.
W. B. McCAIN.
SAW HANDLE.
APPLICATION FILED FEB. 14, 1906.
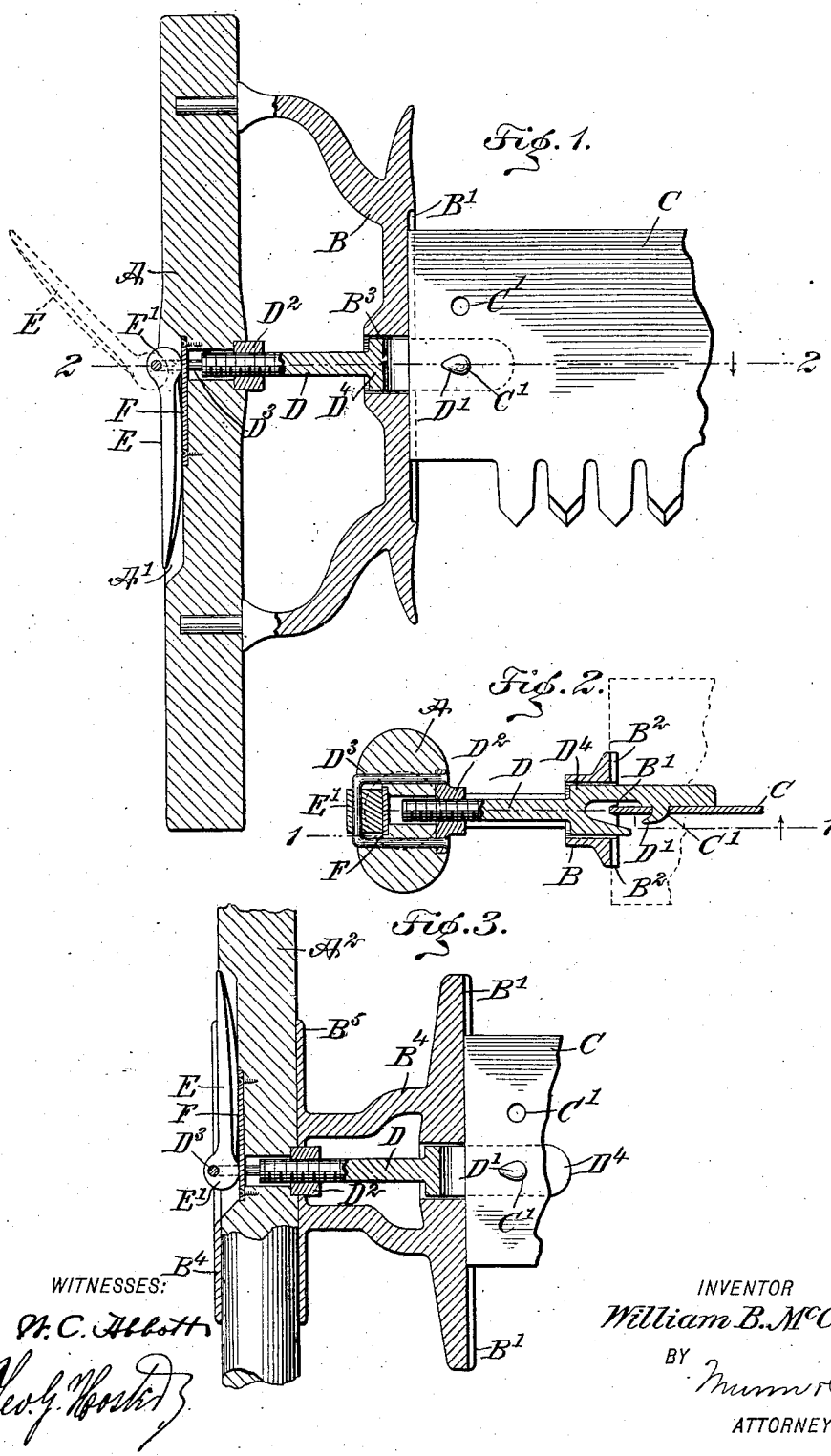
WITNESSES:
INVENTOR
William B. McCain
BY
ATTORNEYS

UNITED STATES PATENT OFFICE.

WILLIAM B. McCAIN, OF CLEARLAKE, WASHINGTON.

SAW-HANDLE.

No. 854,517.

Specification of Letters Patent.

Patented May 21, 1907.

Application filed February 14, 1906. Serial No. 300,999.

*To all whom it may concern:*

Be it known that I, WILLIAM B. MCCAIN, a citizen of the United States, and a resident of Clearlake, in the county of Skagit and State of Washington, have invented a new and Improved Saw-Handle, of which the following is a full, clear, and exact description.

The invention relates to saws manipulated by hand, and its object is to provide a new and improved saw-handle which is simple and durable in construction, easily and quickly attached to or removed from the saw-blade, and without the aid of a wrench, screw-driver or other tool.

The invention consists of novel features and parts and combinations of the same which will be more fully described hereinafter and then pointed out in the claims.

A practical embodiment of the invention is represented in the accompanying drawings forming a part of this specification, in which similar characters of reference indicate corresponding parts in all the views.

Figure 1 is a sectional side elevation of the improvement as applied, the section being on the line 1—1 of Fig. 2; Fig. 2 is a sectional plan view of the same, on the line 2—2 of Fig. 1; and Fig. 3 is a sectional side elevation of a modified form of the improvement.

On the hand-hold A of the saw handle is secured a bracket B, provided with a vertically-disposed guideway B' and a transversely arranged guideway $B^2$, either of which is adapted to be engaged by the end of a saw-blade C so that the hand-hold A either stands vertical and consequently in alinement with the saw-blade C, or transverse thereto when the saw-blade C engages the guideway $B^2$. In the end of the saw-blade C is arranged one or more apertures C', either of which is adapted to be engaged by a hook D' formed on a screw-rod D screwing in a nut $D^2$ provided with a link $D^3$, preferably made U-shape and extending through suitable guideways in the hand-hold A, to pivotally connect with the cam portion E' of a cam lever E having a loose bearing on a bearing plate F attached to the hand-hold A, as plainly indicated in the drawings. The hand-hold A is provided with a recess A' for the cam lever E to fold in, so that the latter does not form an undesirable projection on the hand-hold A, as will be readily understood by reference to Fig. 1.

The head $D^4$ of the screw-rod D carrying the hook D' is mounted to slide longitudinally in a suitable bearing $B^3$ formed in the bracket B, and the said head has one side resting against one face of the saw-blade C when the latter is hooked onto the hook D', so as to insure a firm connection between the saw-blade C and the head $D^4$ of the screw-rod D. Now, when the cam lever E is swung into an open position, as indicated in dotted lines in Fig. 1, then the connection, consisting of the link $D^3$, nut $D^2$ and screw-rod D, is moved longitudinally, so that the saw-blade C moves out of engagement with the corresponding bearing B' or $B^2$ to allow convenient unhooking of the saw-blade C from the hook D'. In a like manner, when it is desired to re-engage or attach the handle of the saw-blade C, then the hook D' is hooked into the aperture C', and then the handle of the cam lever E is swung from its outermost position, shown in dotted lines, down into the recess A', so that the cam portion E' of the cam lever exerts an outward pull on the connection mentioned, so that the said connection draws the saw-blade C toward the bracket B, and the inner end of the saw-blade engaged either of the guideways B' or $B^2$, according to the position of the saw-blade C relative to the bracket.

By having the connection made adjustable in the direction of its length, that is, by screwing the screw-rod D inward or outward in the nut $D^2$, proper adjustment can be made, so that the cam lever E firmly draws the end of the saw-blade C into proper engagement with the corresponding guideway B' or $B^2$.

It is understood that while the device is in use, the screw-rod D is prevented from turning, owing to the head $D^4$ engaging the bearing $B^3$, and the nut $D^2$ is prevented from turning by the link $D^3$ rigidly attached to the nut and mounted to slide in bearings on the hand-hold A.

The shape of the bracket B may be varied without deviating from the spirit of my invention; for instance, as shown in Fig. 3, the bracket $B^4$ is provided with a ferrule $B^5$ engaging the hand-hold $A^2$, but otherwise the construction of the fastening means is the same as above described and shown in Figs. 1 and 2, so that further description of the same is not deemed necessary.

It is evident that by the mechanism described the saw-blade C can be very firmly drawn in position on the bracket attached to the hand-hold A², to securely unite the saw-handle and the saw-blade, and to allow of conveniently and quickly unlocking the several parts, with a view to remove the handle from the saw-blade, whenever it is desired to do so.

I do not limit myself to the detailed construction of the various parts described and shown, as the same may be varied without deviating from the spirit of my invention.

Having thus described my invention, I claim as new and desire to secure by Letters Patent:—

1. A saw handle comprising a hand-hold provided with a transverse aperture, a bracket having a guide-bar provided with a longitudinal guide, a guide-way extending through said bracket, and laterally extending arms connected with said hand-hold, a screw rod extending through said hand-hold and bracket between said arms and provided with a head having a sliding engagement with the guide-way of said bracket, a nut having a threaded engagement with said screw rod, a link secured to said nut, and cam locking mechanism pivotally connected with said link, substantially as shown and described.

2. A saw handle comprising a hand-hold provided with a transverse aperture, a bracket having a guide bar provided with longitudinal and transverse guides, a guide-way extending through said bracket and laterally extending arms connected with said hand-hold, a screw-rod extending through said hand-hold and bracket between said arms, adapted to be secured to a saw blade and provided with a head having a sliding engagement with the guide-way of said bracket and adapted to be reversibly adjusted therein, a nut having a threaded engagement with said screw rod, a link secured to said nut, and cam locking mechanism connected with said link, substantially as shown and described.

In testimony whereof I have signed my name to this specification in the presence of two subscribing witnesses.

WILLIAM B. McCAIN.

Witnesses:
L. S. STEVENS,
H. GILLESPIE.